(No Model.)

C. W. CROSSMAN & A. F. FOWLER.
BEAN HARVESTER.

No. 536,132. Patented Mar. 19, 1895.

WITNESSES:
Lewis E. Flanders
Lois Moulton

INVENTORS.
Albert F. Fowler
Clarence W. Crossman
BY
Luther V. Moulton
ATTORNEY.

THE NORRIS PETERS CO., PHOTO-LITHO., WASHINGTON, D. C.

UNITED STATES PATENT OFFICE.

CLARENCE W. CROSSMAN AND ALBERT F. FOWLER, OF CHAUNCEY, MICHIGAN.

BEAN-HARVESTER.

SPECIFICATION forming part of Letters Patent No. 536,132, dated March 19, 1895.

Application filed July 11, 1894. Serial No. 517,267. (No model.)

*To all whom it may concern:*

Be it known that we, CLARENCE W. CROSSMAN and ALBERT F. FOWLER, citizens of the United States, residing at Chauncey, in the county of Kent and State of Michigan, have invented certain new and useful Improvements in Bean-Harvesters; and we do hereby declare the following to be a full, clear, and exact description of the invention, such as will enable others skilled in the art to which it appertains to make and use the same.

Our invention relates to an improved bean harvester, and its object is to provide the same with certain new and useful features, hereinafter more fully described and particularly pointed out in the claims, reference being had to the accompanying drawings, in which—

Figure 1:
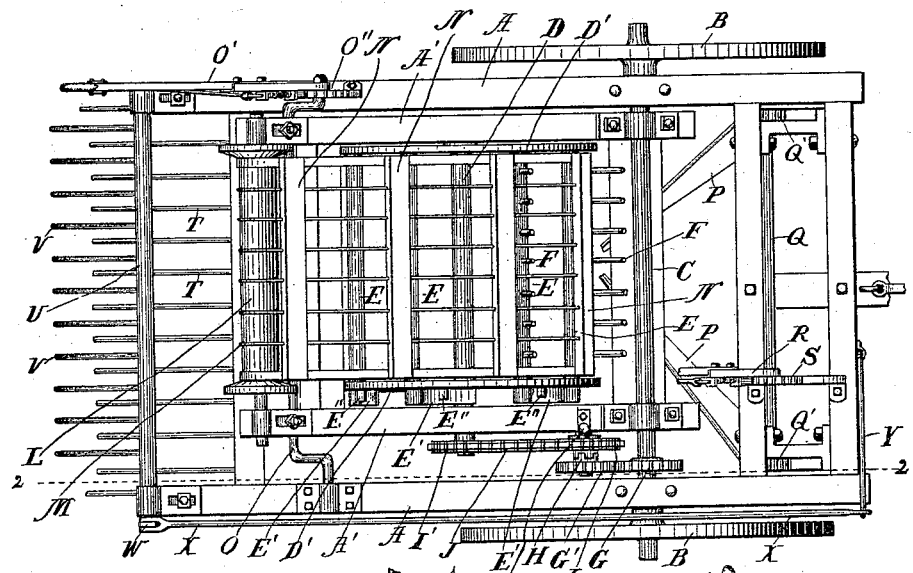
Figure 2:
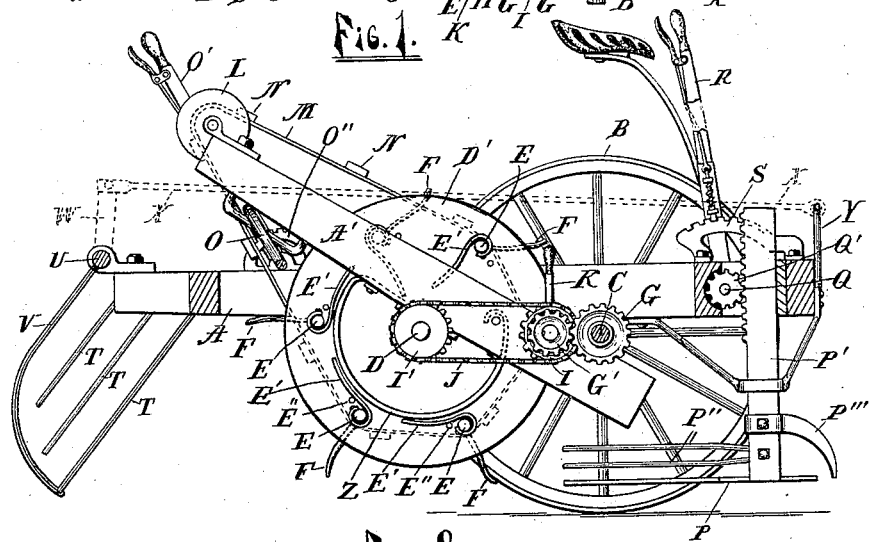

Figure 1 is a plan view of a device embodying my invention; and Fig. 2 a vertical section of the same on the line 2—2 of Fig. 1.

Like letters refer to like parts in both of the figures.

A represents any suitable frame, supported upon a rotative axle C, having the supporting and driving wheels B, B. Within said frame is an inclined and adjustable frame A', journaled on the axle C, near its lower forward end, and supported near its rear end by a shaft O, cranked near each end and journaled at its ends to the frame A, and provided with a lever O', having a latch engaging a notched sector O'', by which said shaft is rotated and adjusted, whereby the middle portion of said shaft is raised or lowered to adjust the rear end of the frame A'. Near the middle of said frame is journaled a transverse shaft D rotated by the shaft C and in the direction opposite thereto by means of a sprocket wheel I', fixed on the shaft D; a gear G fixed on the shaft C; a gear G' engaging the gear G and journaled on a suitable stud; a sprocket wheel I journaled on the same stud, and connected to the gear G' by a detachable clutch H operated by a lever K; and a chain J connecting said sprocket wheels.

On the shaft D are heads, or disks D' near each end, near the circumferences of which and extending between the same is a series of rock shafts E, each having outwardly projecting and forwardly curved fingers F, which extend radially outward between a series of carrier bands M. Extending around the shafts E, which collectively form a drum for the said belts, are carrier bands M which extend thence around a roll L near the upper rear end of the frame A'. Said carrier belts have attached a series of transverse slats N, to elevate the stock, and to the end of each shaft E is attached a flexible arm E', which engages a pin E'' in the disk D' at one side and near the other side the end of said shaft E, and at the other side the end of said arm engages a curved guide Z, which is arranged concentric with the shaft D, and extends but partially around the shaft D. The teeth F are thus flexibly held in radial position to pick up the stock and elevate the same to the carrier, the arms E' yielding should the teeth F strike any unyielding obstruction, and as the said arms pass the gap in the guide Z, the rock shafts E are free to turn and let the teeth F fall back and be released from the stock as the latter is carried away by the belts M. Beneath the rear end of said frame A' is a series of rearwardly and downwardly inclined teeth T to receive the stock, and at a suitable distance to the rear of these, is a series of teeth V attached to a rock shaft U, and normally parallel with the teeth T and curved downward and forward, to near the ends of the latter, whereby a basket or receptacle is formed to receive the stock. Said shaft U is provided with an arm W, a connecting rod X, and a foot lever Y, by means of which the shaft U may be periodically rotated and the teeth V lifted to permit the stock to escape. Near the forward angles of the frame A are vertically movable posts P', having attached at their lower ends horizontal knives or cutters P, which latter are inclined inward and rearward, toward each other, and above said knives are fingers P'' parallel to said knives and also attached to said posts, to which posts are also attached guards P''', to push aside, or cut any obstructions that might engage the lower ends of said posts P'. Said posts are also vertically and simultaneously adjusted by means of pinions Q' engaging racks on said posts and fixed on a transverse rock shaft Q, provided with an adjusting lever R, having a latch engaging a notched sector S. By vertically adjusting the post P' and parts attached the knives P will run just beneath the surface of the earth and sever the vines and the fingers P'' will conduct the vines toward the middle of the machine, which may be wide enough to operate upon two rows at once. The stock is taken up by the fingers F, which are vertically adjusted by means of the cranked shaft O, and lever O' and are carried up the inclined carrier M, N, and deposited in the open basket formed by the fingers V, T, and are finally dropped in bunches by operating the lever Y at intervals.

What we claim is—

1. In a bean harvester, the combination of vertically movable posts having racks, inwardly inclined knives and fingers attached to said posts, pinions engaging said racks, a transverse shaft supporting said pinions, a lever on said shaft, having a latch engaging a notched sector, substantially as described.

2. In a bean harvester the combination of vertically adjustable and inwardly inclined knives and fingers, an inclined elevator, and a receptacle consisting of fixed and movable bars at the rear of said elevator, and means for periodically opening said receptacle and discharging its contents, substantially as described.

3. In a bean harvester, the combination of the knives for severing the vines, the fingers for conducting the vines toward the middle of the machine, the rotating series of fingers for picking said vines up, the carrier upon which the vines are deposited by said last-mentioned fingers, and the basket into which the vines are deposited by the carrier, substantially as shown and described.

4. In a bean harvester, the combination of vertically-adjustable knives for severing the vines, the adjustable rotating fingers for picking said vines up, and the carrier upon which the vines are deposited by the fingers, substantially as shown and described.

5. In a bean harvester, the combination of vertically-adjustable knives for severing the vines, and the vertically-adjustable fingers for conducting the vines toward the middle of the machine, with the adjustable rotating fingers for picking said vines up, and the carrier upon which the vines are deposited by said latter fingers, substantially as shown and described.

6. In a bean harvester, the combination with the carrier, the adjustable carrier-frame, the shaft D having disks near each end, the rock shafts connecting said disks, and the fingers upon said rock shafts, said fingers being adjusted by adjusting said carrier frame, of adjustable cutting knives, substantially as shown and described.

7. In a bean harvester, the combination with vertically-adjustable posts, of cutting knives, conducting fingers and guards, attached to and adjustable with said posts, substantially as shown and described.

In testimony whereof we affix our signatures in presence of two witnesses.

CLARENCE W. CROSSMAN.
ALBERT F. FOWLER.

Witnesses:
LUTHER V. MOULTON,
LEWIS E. FLANDES.